United States Patent
Tan et al.

(10) Patent No.: US 7,923,497 B2
(45) Date of Patent: Apr. 12, 2011

(54) ANTIFERROELECTRIC POLYMER COMPOSITES, METHODS OF MANUFACTURE THEREOF, AND ARTICLES COMPRISING THE SAME

(75) Inventors: Daniel Qi Tan, Rexford, NY (US); Yang Cao, Niskayuna, NY (US); Patricia Chapman Irwin, Altamont, NY (US); Venkat S. Venkataramani, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 690 days.

(21) Appl. No.: 11/286,062

(22) Filed: Nov. 23, 2005

(65) Prior Publication Data

US 2007/0117913 A1    May 24, 2007

(51) Int. Cl.
    *C08J 3/00*    (2006.01)
(52) U.S. Cl. .......... 524/394; 524/544; 524/403; 528/92; 528/411
(58) Field of Classification Search .......... 524/394, 524/403, 544; 528/92, 411
    See application file for complete search history.

(56) References Cited

U.S. PATENT DOCUMENTS

| | | | |
|---|---|---|---|
| 4,917,810 A * | 4/1990 | Tsunooka et al. | 252/62.9 R |
| 5,555,219 A * | 9/1996 | Akiyama et al. | 349/182 |
| 5,650,031 A | 7/1997 | Bolon et al. | |
| 5,951,908 A * | 9/1999 | Cui et al. | 252/62.9 R |
| 6,544,651 B2 | 4/2003 | Wong et al. | |
| 6,632,109 B2 | 10/2003 | Irwin et al. | |
| 6,778,053 B1 | 8/2004 | Irwin et al. | |
| 6,821,474 B2 * | 11/2004 | Lauf et al. | 264/435 |
| 6,864,306 B2 | 3/2005 | Rao et al. | |
| 7,267,840 B2 * | 9/2007 | Ohnishi et al. | 427/100 |
| 2003/0017351 A1 | 1/2003 | Hayashi et al. | |
| 2004/0060730 A1 | 4/2004 | Lauf et al. | |
| 2004/0265551 A1 | 12/2004 | Takaya et al. | |
| 2005/0080175 A1 * | 4/2005 | Paik et al. | 524/418 |
| 2005/0161149 A1 | 7/2005 | Yokota et al. | |
| 2005/0256240 A1 | 11/2005 | Nelson | |
| 2007/0116976 A1 | 5/2007 | Tan et al. | |
| 2007/0117886 A1 | 5/2007 | Tan et al. | |
| 2007/0117913 A1 | 5/2007 | Tan et al. | |
| 2007/0258190 A1 | 11/2007 | Irwin et al. | |

FOREIGN PATENT DOCUMENTS

| | | |
|---|---|---|
| CN | 1670073 | 9/2005 |
| EP | 1271578 A2 * | 1/2003 |
| EP | 1271578 | 2/2003 |
| WO | WO 01/89827 A1 | 11/2001 |

(Continued)

OTHER PUBLICATIONS

EP Search Report, EP06124528, Feb. 27, 2007.

(Continued)

*Primary Examiner* — Peter D. Mulcahy
*Assistant Examiner* — Henry Hu
(74) *Attorney, Agent, or Firm* — Ann M. Agosti

(57) ABSTRACT

Disclosed herein is a composition comprising a composition comprising a polymeric material; and a ceramic antiferroelectric particle. Disclosed herein too is a method of tuning a dielectric constant of a composition comprising subjecting a composition comprising a polymeric material and a ceramic antiferroelectric particle to a biasing electric field; and changing the dielectric constant of the composition. Disclosed herein too is a method comprising blending a polymeric material with ceramic antiferroelectric particles to form a composition. Disclosed herein too is a method comprising blending a polymeric material with ceramic antiferroelectric particles to form a composition; applying an electrical field to the composition; and reorienting the ceramic antiferroelectric particles.

14 Claims, 3 Drawing Sheets

FOREIGN PATENT DOCUMENTS

| WO | 03054259 | 7/2003 |
|---|---|---|
| WO | 2006124670 | 11/2006 |

OTHER PUBLICATIONS

CN1670073, English Abstract, D. Lijie et al., Sep. 21, 2005.

JP58141222. Publication Date Aug. 22, 1983. "High-Dielectric Film". (Abstract Only).

Colin Kydd Campbell. "Experimental and Theoretical Characterization of an Antiferroelectric Ceramic Capacitor for Power Electronics". IEEE Transactions on Components and Packaging Technologies, vol. 25, No. 2, pp. 211-216, Jun. 2002.

Jianwen Xu and C.P. Wong[a]. "Low-loss percolative dielectric composite" Applied Physics Letters 87, 082907, pp. 082907-1,2,3, 2005.

Y. Bai, Z.-Y. Cheng, V. Gharti, H.S. Xu, and Q.M. Zhang[a]. "High-dielectric-constant ceramic-powder polymer composites" Applied Physics Letters, vol. 76, No. 25, pp. 3804-3806, published Apr. 28, 2000.

E. Aulagner, J. Guillet, G. Seytre, C. Hantouche, P. Le Gonidec, G. Terzulli. "(PVDF/BatiO$_3$) and (PP/BaTiO$_3$) Films for Energy Storage Capacitors" 1995 IEEE 5$^{th}$ International Conference on Conduction and Breakdown in Solid Dielectrics. pp. 423-427. 1995.

D. Dimos. "Perovskite Thin Films for High-Frequency Capacitor Applications[1]". Annual Review of Materials Science. vol. 28: 397-419 (Volume publication date Aug. 1998).

Fantoni et al., "Wire System Aging Assessment and Condition Monitoring," Nordic Nuclear Safety Research, ISBN 87-7893-192-4, Apr. 2006.

Krogh et al., "High Breakdown Strength, Multilayer Ceramics for Compact Pulsed Power Applications," Federal Manufacturing & Technologies, Allied Signal, KSP-613-6212, Jul. 1999.

Lanagan et al., "Microwave Dielectric Properties of Antiferroelectric Lead Zirconate," Journal of the American Ceramic Society, vol. 71, No. 4, pp. 311-316, Apr. 1988.

McNeal et al., "Particle Size Dependent High Frequency Dielectric Properties of Barium Titanate," ISAF '96, Proceedings of the Tenth IEEE International Symposium on Applications of Ferroelectrics, pp. 837-840.

\* cited by examiner

US 7,923,497 B2

ANTIFERROELECTRIC POLYMER COMPOSITES, METHODS OF MANUFACTURE THEREOF, AND ARTICLES COMPRISING THE SAME

BACKGROUND

This disclosure relates to antiferroelectric polymer composites, methods of manufacture thereof, and articles comprising the same.

It is desirable in commercial applications, such as spark plug caps for automobiles, to have a high dielectric constant and high breakdown voltage. Spark plug caps are generally manufactured from polymeric composites. High dielectric constants in polymeric composites are generally achieved by using large volume fractions of fillers. This however, reduces mechanical properties such as impact strength and ductility in the spark plug cap.

It is also desirable for energy storage devices, such as DC-link capacitors, that are utilized in high energy density power conversion applications to withstand the high voltage and high temperature environments of electrical devices such as motors and generators. It is therefore desirable for such storage devices to display a high breakdown voltage and corona resistance. In the electronics industry, it is also desirable to have a suitable high dielectric constant material that satisfies the electrical, reliability, and processing requirements for incorporating capacitors into a printed wiring board. In the electronics industry as well as in the automotive industry, there is therefore a need for new polymeric composites having a high dielectric constant and a high breakdown strength as well as good mechanical strength and processability.

It is therefore desirable to have a composition that combines a high dielectric constant and high energy storage capabilities with ease of processing as well as with improved mechanical properties over currently existing high dielectric constant composites.

SUMMARY

Disclosed herein is a composition comprising a polymeric material and a ceramic antiferroelectric particle.

Disclosed herein too is a method of tuning a dielectric constant of a composition comprising subjecting a composition comprising a polymeric material and a ceramic antiferroelectric particle to a biasing electric field; and changing the dielectric constant of the composition.

Disclosed herein too is a method comprising blending a polymeric material with ceramic antiferroelectric particles to form a composition.

Disclosed herein too is a method comprising blending a polymeric material with ceramic antiferroelectric particles to form a composition; applying an electrical field to the composition; and reorienting the ceramic antiferroelectric particles.

DETAILED DESCRIPTION OF FIGURES

DETAILED DESCRIPTION

Figure 1:
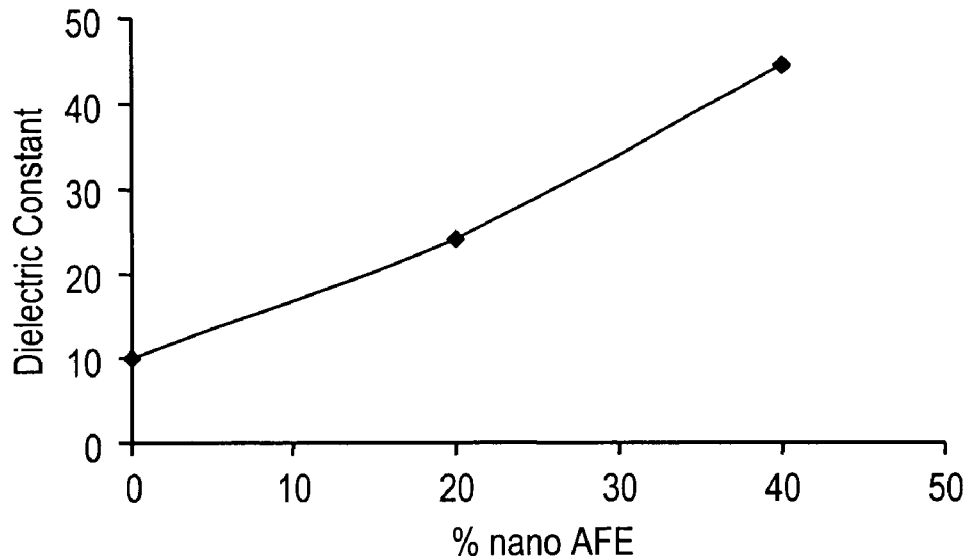
FIG. 1 represents a graph of the increase in dielectric constant as a function of the amount of nanosized antiferroelectric particles incorporated into a polymeric material.

It is to be noted that the terms "first," "second," and the like as used herein do not denote any order, quantity, or importance, but rather are used to distinguish one element from another. The terms "a" and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). It is to be noted that all ranges disclosed within this specification are inclusive and are independently combinable.

Disclosed herein are compositions comprising a polymeric material and ceramic antiferroelectric particles. The ceramic antiferroelectric particles can be converted to ferroelectric particles upon the application of an activating field. In one embodiment, the activating field can comprise a biasing electrical field. In another embodiment, the activating field can comprise a biasing electric field that is applied in the presence of a source of thermal energy, such as, for example, an oven. Thus, the antiferroelectric particles are field-tunable, nonlinear dielectric particles that can undergo a phase transition from a low dielectric state (antiferroelectric state) to a high dielectric state (ferroelectric state) upon being exposed to a biasing electric field. These advantageous properties of the antiferroelectric particles permit the composition to be field tunable. Field tunable compositions can advantageously have their dielectric properties adjusted upon demand depending upon the application for which they are to be used.

The ferroelectric effect is an electrical phenomenon whereby certain ionic crystals may exhibit a spontaneous dipole moment. There are two main types of ferroelectrics, displacive and order-disorder. For example, the effect in barium titanate, is of the displacive type and is due to a polarization catastrophe, in which, if an ion is displaced from equilibrium slightly, the force from the local electric fields due to the ions in the crystal increase faster than the elastic restoring forces. This leads to an asymmetrical shift in the equilibrium ion positions and hence to a permanent dipole moment. In an order-disorder ferroelectric, there is a dipole moment in each unit cell, but at high temperatures they are pointing in random directions. Upon lowering the temperature and going through the phase transition, the dipoles order, all pointing in the same direction within a domain. As a result of the aforementioned ordering that occurs in ferroelectric materials, these materials have a high dielectric constant of greater than or equal to about 1000. In an antiferroelectric transition individual dipoles become arranged anti-parallel to adjacent dipoles with the result that the net spontaneous polarization is zero. Thus materials in their antiferroelectric states generally have low dielectric constants of about 100 to about 1000.

The antiferroelectric particles can exist in the form of nanoparticles or micrometer sized particles. These antiferroelectric particles generally have a dielectric constant that is similar to the dielectric constant for the polymeric material. This permits a higher field penetration of the particles when compared with ferroelectric particles. As noted above, the antiferroelectric particles intrinsically undergo a phase transition from being antiferroelectric to ferroelectric upon the application of an electric field. The antiferroelectric particles upon being dispersed in a polymer can be triggered to undergo a phase transition from the antiferroelectric state to the ferroelectric state upon the application of an electrical field of less than or equal to about 100 kilovolts/millimeter. As a result, the dielectric constant of the composition would be increased by an amount of greater than or equal to about 500% when compared with a composition that does not contain the antiferroelectric particles.

The antiferroelectric particles can be advantageously dispersed in the polymeric material and can increase the dielectric constant of the composition. The well-dispersed particles within the polymeric material provide improved properties over a polymeric material that does not contain the antiferroelectric particles. These improved properties include a higher dielectric constant, higher energy densities, improved breakdown strength, optical transparency, corona resistance, improved impact strength and ductility, as well as improved ease of processing and a Class A surface finish.

In one embodiment, the composition has a breakdown voltage of greater than or equal to about 200 V/micrometer. The composition advantageously has an energy density of greater than or equal to about 1 J/cm$^3$ to greater than or equal to about 10 J/cm$^3$. Upon being subjected to the biasing electric field, the dielectric constant of the composition can be increased by at least one order of magnitude depending upon the amount of the ceramic antiferroelectric particles in the composition.

The polymeric material used in the compositions may be selected from a wide variety of thermoplastic polymers, thermosetting polymers, blends of thermoplastic polymers, blends of thermosetting polymers, or blends of thermoplastic polymers with thermosetting polymers. The polymeric material can comprise a homopolymer, a copolymer such as a star block copolymer, a graft copolymer, an alternating block copolymer or a random copolymer, ionomer, dendrimer, or a combination comprising at least one of the foregoing. The polymeric material may also be a blend of polymers, copolymers, terpolymers, or the like, or a combination comprising at least one of the foregoing.

Examples of thermoplastic polymers that can be used in the polymeric material include polyacetals, polyacrylics, polycarbonates, polyalkyds, polystyrenes, polyolefins, polyesters, polyamides, polyaramides, polyamideimides, polyarylates, polyurethanes, epoxies, phenolics, silicones, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polypropylenes, polyethylenes, polyethylene terephthalates, polyvinylidene fluorides, polysiloxanes, or the like, or a combination comprising at least one of the foregoing thermoplastic polymers.

Exemplary thermoplastic polymers include polyetherimide, polyvinylidene fluoride, polyvinylidine fluoride-trifluoroethylene P(VDF-TrFE), polyvinylidene-tetrafluoroethylene copolymers P(VDF-TFE), polyvinylidine trifluoroethylene hexafluoropropylene copolymers P(VDF-TFE-HFE) and polyvinylidine hexafluoropropylene copolymers P(VDF-HFE), epoxy, polypropylene, polyester, polyimide, polyarylate, polyphenylsulfone, polystyrene, polyethersulfone, polyamideimide, polyurethane, polycarbonate, polyetheretherketone, silicone, or the like, or a combination comprising at least one of the foregoing. An exemplary polymer is ULTEM®, a polyetherimide, commercially available from General Electric Plastics.

Examples of blends of thermoplastic polymers include acrylonitrile-butadiene-styrene/nylon, polycarbonate/acrylonitrile-butadiene-styrene, polyphenylene ether/polystyrene, polyphenylene ether/polyamide, polycarbonate/polyester, polyphenylene ether/polyolefin, or the like, or a combination comprising at least one of the foregoing.

Examples of thermosetting polymers are resins of epoxy/amine, epoxy/anhydride, isocyanate/amine, isocyanate/alcohol, unsaturated polyesters, vinyl esters, unsaturated polyester and vinyl ester blends, unsaturated polyester/urethane hybrid resins, polyurethane-ureas, thermoset polyphenylene ether, silicone, reactive dicyclopentadiene resin, reactive polyamides, or the like, or a combination comprising at least one of the foregoing.

In one embodiment, suitable thermosetting polymers include thermosetting polymers that can be made from an energy activatable thermosetting pre-polymer composition. Examples include polyurethanes such as urethane polyesters, silicone polymers, phenolic polymers, amino polymers, epoxy polymers, bismaleimides, polyimides, and furan polymers. The energy activatable thermosetting pre-polymer component can comprise a polymer precursor and a curing agent. The polymer precursor can be heat activatable, eliminating the need for a catalyst. The curing agent selected will not only determine the type of energy source needed to form the thermosetting polymer, but may also influence the resulting properties of the thermosetting polymer. Examples of curing agents include aliphatic amines, aromatic amines, acid anhydrides, or the like, or a combination comprising at least one of the foregoing. The energy activatable thermosetting pre-polymer composition may include a solvent or processing aid to lower the viscosity of the composition for ease of extrusion including higher throughputs and lower temperatures. The solvent could help retard the crosslinking reaction and could partially or totally evaporate during or after polymerization.

As noted above, it is desirable for the polymeric material to have a glass transition temperature of greater than or equal to about 150° C. In one embodiment, it is desirable for the polymeric material to have a glass transition temperature of greater than or equal to about 175° C. In another embodiment, it is desirable for the polymeric material to have a glass transition temperature of greater than or equal to about 200° C. In yet another embodiment, it is desirable for the polymeric material to have a glass transition temperature of greater than or equal to about 225° C. In yet another embodiment, it is desirable for the polymeric material to have a glass transition temperature of greater than or equal to about 250° C.

In one embodiment, the polymeric material is used in an amount of about 5 to about 99.999 wt % of the total weight of the composition. In another embodiment, the polymeric material is used in an amount of about 10 wt % to about 99.99 wt % of the total weight of the composition. In another embodiment, the polymeric material is used in an amount of about 30 wt % to about 99.5 wt % of the total weight of the composition. In another embodiment, the polymeric material is used in an amount of about 50 wt % to about 99.3 wt % of the total weight of the composition.

The antiferroelectric particles are generally ferroelectric particles that are converted into their antiferroelectric state prior to incorporating them into the composition. It is generally desirable for the antiferroelectric particles in the antiferroelectric state to have a dielectric constant that is as close as possible to the dielectric constant of the polymeric material. In one embodiment, the antiferroelectric particles (in the antiferroelectric state) have a dielectric constant whose value is within 10% of the value of the dielectric constant of the polymeric material. In another embodiment, the antiferroelectric particles (in the antiferroelectric state) have a dielectric constant whose value is within 20% of the value of the dielectric constant of the polymeric material. In yet another embodiment, the antiferroelectric particles (in the antiferroelectric state) have a dielectric constant whose value is within 50% of the value of the dielectric constant of the polymeric material. Examples of antiferroelectric particles are those derived from perovskites.

In one embodiment, the antiferroelectric particle is one that has the formula (I)

$$Pb(M_1, M_2, M_3, \ldots)O_3 \qquad (I)$$

where $M_1$, $M_2$, $M_3$, are transition metals or rare earth metals. Examples of transition metals are those present in groups 3d, 4d and 5d of the periodic table, such as, of example, scandium, iron, titanium chromium, zirconium, or the like, or a combination comprising at least one of the foregoing transition metals. Examples of rare earth metals are lanthanum, cerium, neodymium, gadolinium, samarium, or the like, or a combination comprising at least one of the foregoing rare earth metals.

An example of an antiferroelectric particle is one that comprises lead zirconium titanate (PZT) shown in the formula (II) below:

$$Pb(Zr_x Ti_{1-x})O_3 \qquad (III)$$

where x is up to about 1. In one embodiment, x can have a value of about 0.3 to about 1. In another embodiment, x can have a value of about 0.6 to about 1. In yet another embodiment, x can have a value of about 0.9 to about 1. The PZT antiferroelectric particles exist in the form of a solid solution that spans a wide compositional space and, consequently, a wide range of dielectric properties. The phase boundaries and electrical properties of PZT can also be further modified by doping. For example, substitution of $La^{3+}$ for $Pb^{2+}$ can lead to ferroelectric particles with permittivities up to 7000 that can be converted into antiferroelectric particles. Examples of PZT and PZT derivatives include $PbHfO_3$, $PbZrO_3$, modified $Pb(ZrTi)O_3$, $PbLa(ZrSnTi)O_3$, $PbNb(ZrSnTi)O_3$, or the like, or a combination comprising at least one of the foregoing antiferroelectric particles. An exemplary antiferroelectric particle is lead zirconate (PbZrO3).

Another example of an antiferroelectric particle is one that comprises lead lanthanum zirconium titanates (PLZT) in formula (III):

$$Pb_{1-x}La_x(Zr_y Ti_{1-y})_{1-x/4}O_3 \qquad (III)$$

where x and y can each have a value of up to 1 respectively and wherein x and y are independent of each other. In one embodiment, x can have a value of about 0.1 to about 0.3, while y can have a value of about 0.8 to about 1.

Yet another example of an antiferroelectric particle is one that comprises lead scandium niobates (PSN) in formula (IV) or lead scandium tantalate (PST) in formula (V):

$$PbSc_x Nb_{1-y}O_3 \qquad (IV)$$

$$PbSc_x Ta_{1-x}O_3 \qquad (V)$$

Other antiferroelectric particles are $PbSc_{1/2}Nb_{1/2}O_3$—$PbLu_{1/2}Nb_{1/2}O_3$, $SrTiO_3$—$PbZrO_3$, lead scandium niobium titanate (PSNT) and lead lutetium niobium titanate (PLuNT).

In another embodiment, the antiferroelectric particles are lead-free. Examples of antiferroelectric particles include $NaNbO_3$, $(K,Na)(Nb,Ta)O_3$, $KNbO_3$, $BaZrO_3$, $Na_{0.25}K_{0.25}Bi_{0.5}TiO_3$, $Ag(Ta,Nb)O_3$ and $Na_{0.5}Bi_{0.5}TiO_3$—$K_{0.5}Bi_{0.5}TiO_3$—$BaTiO_3$ or the like, or a combination comprising at least one of the foregoing lead-free antiferroelectric particles.

As noted above, the particles can undergo a phase transition from a low dielectric constant (antiferroelectric state) to a high dielectric constant (ferroelectric state) when subjected to an electrical biasing field. In one embodiment, the antiferroelectric particles can undergo a phase transition from an antiferroelectric (low dielectric constant) state to a ferroelectric (high dielectric constant) state when subjected to an electrical biasing field of greater than or equal to about 4 kilovolts/millimeter (kV/mm). In one embodiment, the antiferroelectric particles can undergo a phase transition from an antiferroelectric (low dielectric constant) state to a ferroelectric (high dielectric constant) state when subjected to an electrical biasing field of greater than or equal to about 60 kilovolts/millimeter (kV/mm). In yet another embodiment, the antiferroelectric particles that can undergo a phase transition from an antiferroelectric (low dielectric constant) state to a ferroelectric (high dielectric constant) state when subjected to an electrical biasing field of greater than or equal to about 200 kilovolts/millimeter (kV/mm).

In one embodiment, the dielectric constant of the composition increases by greater than or equal to 50% upon the phase transition. In another embodiment, the dielectric constant of the composition increases by greater than or equal to 100% upon the phase transition. In another embodiment, the dielectric constant of the composition increases by greater than or equal to 500% upon the phase transition.

As noted above, the antiferroelectric particles can have particle sizes in the nanometer range ($10^{-9}$ meter range) or micrometer ($10^{-6}$ meter range). In one embodiment, the antiferroelectric particles have particle sizes of about 5 nanometers to about 10 micrometers. In another embodiment, the antiferroelectric particles have particle sizes of about 10 nanometers to about 1 micrometer. In another embodiment, the antiferroelectric particles have particle sizes of about 50 nanometers to about 500 nanometers. In yet another embodiment, the antiferroelectric particles have particle sizes of about 100 nanometers to about 400 nanometers.

In one embodiment, the particles can be surface treated to facilitate bonding with the polymeric material. In one embodiment, the surface treatment comprises coating the particles with a silane-coupling agent. Examples of suitable silane-coupling agents include tetramethylchlorosilane, hexadimethylenedisilazane, gamma-aminopropoxysilane, or the like, or a combination comprising at least one of the foregoing silane coupling agents. The silane-coupling agents generally enhance compatibility of the antiferroelectric particles with the polymeric material and improve dispersion of the antiferroelectric particles within the polymeric material.

As noted above, the antiferroelectric particles have at least one dimension in the nanometer or micrometer range. It is generally desirable for the antiferroelectric particles to have an average largest dimension that is less than or equal to about 10 micrometers. The dimension may be a diameter, edge of a face, length, or the like. The antiferroelectric particles may have shapes whose dimensionalities are defined by integers, e.g., the antiferroelectric particles are either 1, 2 or 3-dimensional in shape. They may also have shapes whose dimensionalities are not defined by integers (e.g., they may exist in the form of fractals). The antiferroelectric particles may exist in the form of spheres, flakes, fibers, whiskers, or the like, or a combination comprising at least one of the foregoing forms. The antiferroelectric particles may have cross-sectional geometries that may be circular, ellipsoidal, triangular, rectangular, polygonal, or a combination comprising at least one of the foregoing geometries. The antiferroelectric particles, as commercially available, may exist in the form of aggregates or agglomerates prior to incorporation into the polymeric material or even after incorporation into the polymeric material. An aggregate comprises more than one particle in physical contact with one another, while an agglomerate comprises more than one aggregate in physical contact with one another.

Regardless of the exact size, shape and composition of the antiferroelectric particles, they may be dispersed into the polymeric material at loadings of about 0.1 to about 85 wt % of the total weight of the composition when desired. In one embodiment, the antiferroelectric particles are present in an amount of greater than or equal to about 1 wt % of the total weight of the composition. In another embodiment, the antiferroelectric particles are present in an amount of greater than or equal to about 10 wt % of the total weight of the composition. In yet another embodiment, the antiferroelectric particles are present in an amount of greater than or equal to about 30 wt % of the total weight of the composition. In one embodiment, the antiferroelectric particles are present in an amount of less than or equal to 85 wt % of the total weight of the composition. In another embodiment, the antiferroelectric particles are present in an amount of less than or equal to about 70 wt % of the total weight of the composition. In yet another embodiment, the antiferroelectric particles are present in an amount of less than or equal to about 60 wt % of the total weight of the composition.

The polymeric material together with the antiferroelectric particles and any other optionally desired fillers may generally be processed in several different ways such as, but not limited to melt blending, solution blending, or the like, or a combination comprising at least one of the foregoing methods of blending. Melt blending of the composition involves the use of shear force, extensional force, compressive force, ultrasonic energy, electromagnetic energy, thermal energy or a combination comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or a combination comprising at least one of the foregoing.

Melt blending involving the aforementioned forces may be conducted in machines such as, but not limited to, single or multiple screw extruders, Buss kneader, Henschel, helicones, Ross mixer, Banbury, roll mills, molding machines such as injection molding machines, vacuum forming machines, blow molding machine, or then like, or a combination comprising at least one of the foregoing machines. It is generally desirable during melt or solution blending of the composition to impart a specific energy of about 0.01 to about 10 kilowatt-hour/kilogram (kwhr/kg) of the composition. Within this range, a specific energy of greater than or equal to about 0.05, preferably greater than or equal to about 0.08, and more preferably greater than or equal to about 0.09 kwhr/kg is generally desirable for blending the composition. Also desirable is an amount of specific energy less than or equal to about 9, preferably less than or equal to about 8, and more preferably less than or equal to about 7 kwhr/kg for blending The composition.

The particles can be in the antiferroelectric state or the ferroelectric state prior to the incorporation into the polymeric material. The particles that are in the ferroelectric state after incorporation into the polymeric material are converted to the antiferroelectric state prior to use in a particular application. In general, it is desirable to have the particles be in the antiferroelectric state prior to use in a particular application. As noted above, a biasing electric field of less than or equal to about 100 kilovolts/millimeter is generally used to change the state of the antiferroelectric particles (from the antiferroelectric state to the ferroelectric state) that are incorporated into the polymers. This biasing electric field can be accompanied by the application of heat to the sample. Heat may be applied in the form of convection, conduction or radiation to the sample during the application of a biasing electrical field.

In one embodiment, the polymeric material in powder form, pellet form, sheet form, or the like, may be first dry blended with the antiferroelectric particles and other optional fillers if desired in a Henschel or a roll mill, prior to being fed into a melt blending device such as an extruder or Buss kneader. In another embodiment, the antiferroelectric particles are introduced into the melt blending device in the form of a masterbatch. In such a process, the masterbatch may be introduced into the melt blending device downstream of the polymeric material.

When a masterbatch is used, the antiferroelectric particles may be present in the masterbatch in an amount of about 10 to about 85 wt %, of the total weight of the masterbatch. In one embodiment, the antiferroelectric particles are used in an amount of greater than or equal to about 30 wt % of the total weight of the masterbatch. In another embodiment, the antiferroelectric particles are used in an amount of greater or equal to about 40 wt %, of the total weight of the masterbatch. In another embodiment, the antiferroelectric particles are used in an amount of greater or equal to about 45 wt %, of the total weight of the masterbatch. In one embodiment, the antiferroelectric particles are used in an amount of less than or equal to about 85 wt %, of the total weight of the masterbatch. In another embodiment, the antiferroelectric particles are used in an amount of less than or equal to about 75 wt %, of the total weight of the masterbatch. In another embodiment, the antiferroelectric particles are used in an amount of less than or equal to about 65 wt %, of the total weight of the masterbatch. Examples of polymeric materials that may be used in masterbatches are polypropylene, polyetherimides, polyamides, polyesters, or the like, or a combination comprising at least on of the foregoing polymeric materials. In another embodiment relating to the use of masterbatches in polymeric blends, it is sometimes desirable to have the masterbatch comprising a polymeric material that is the same as the polymeric material that forms the continuous phase of the composition. In yet another embodiment relating to the use of masterbatches in polymeric blends, it may be desirable to have the masterbatch comprising a polymeric material that is different in chemistry from other the polymers that are used in the composition. In this case, the polymeric material of the masterbatch will form the continuous phase in the blend.

The composition comprising the polymeric material and the antiferroelectric particles may be subject to multiple blending and forming steps if desirable. For example, the composition may first be extruded and formed into pellets. The pellets may then be fed into a molding machine where it may be formed into other desirable shapes. Alternatively, the composition emanating from a single melt blender may be formed into sheets or strands and subjected to post-extrusion processes such as annealing, uniaxial or biaxial orientation.

Solution blending may also be used to manufacture the composition. The solution blending may also use additional energy such as shear, compression, ultrasonic vibration, or the like to promote homogenization of the particles with the polymeric material. In one embodiment, a polymeric material suspended in a fluid (e.g., a solvent) may be introduced into an ultrasonic sonicator along with the antiferroelectric particles. The mixture may be solution blended by sonication for a time period effective to disperse the antiferroelectric particles within the polymeric material and the fluid. The polymeric material along with the antiferroelectric particles may then be dried, extruded and molded if desired. It is generally desirable for the fluid to swell the polymeric material during the process of sonication. Swelling the polymeric material generally improves the ability of the antiferroelectric particles to be impregnated with the polymeric material during the solution blending process and consequently improves dispersion.

In another embodiment related to solution blending, the antiferroelectric particles are sonicated together with polymeric material precursors. Polymeric material precursors are generally monomers, dimers, trimers, or the like, which can be reacted into polymeric materials. A fluid such as a solvent may optionally be introduced into the sonicator with the antiferroelectric particles and the polymeric material precursor. The time period for the sonication is generally an amount effective to promote encapsulation of the antiferroelectric particles by the polymeric material precursor. After the encapsulation, the polymeric material precursor is then polymerized to form a polymeric material within which is dispersed the antiferroelectric particles.

Suitable examples of monomers that may be used to facilitate this method of encapsulation and dispersion are those used in the synthesis of polymers such as, but not limited to polyacetals, polyacrylics, polycarbonates, polystyrenes, polyesters, polyamides, polyamideimides, polyarylates, polyurethanes, polyarylsulfones, polyethersulfones, polyarylene sulfides, polyvinyl chlorides, polysulfones, polyetherimides, polytetrafluoroethylenes, polyetherketones, polyether etherketones, or the like, or a combination comprising at least one of the foregoing. In one embodiment, the mixture of polymeric material, polymeric material precursor, fluid and/or the particles is sonicated for a period of about 1 minute to about 24 hours. In another embodiment, the mixture is sonicated for a period of greater than or equal to about 5 minutes. In another embodiment, the mixture is sonicated for a period of greater than or equal to about 10 minutes. In another embodiment, the mixture is sonicated for a period of greater than or equal to about 15 minutes. In one embodiment, the mixture is sonicated for a period of less than or equal to about 15 hours. In another embodiment, the mixture is sonicated for a period of less than or equal to about 10 hours. In another embodiment, the mixture is sonicated for a period of and more preferably less than or equal to about 5 hours.

Solvents may optionally be used in the solution blending of the composition. The solvent may be used as a viscosity modifier, or to facilitate the dispersion and/or suspension of particles. Liquid aprotic polar solvents such as propylene carbonate, ethylene carbonate, butyrolactone, acetonitrile, benzonitrile, nitromethane, nitrobenzene, sulfolane, dimethylformamide, N-methylpyrrolidone (NMP), or the like, or a combination comprising at least one of the foregoing solvents may be used. Polar protic solvents such as water, methanol, acetonitrile, nitromethane, ethanol, propanol, isopropanol, butanol, or the like, or a combination comprising at least one of the foregoing polar protic solvents may be used. Other non-polar solvents such benzene, toluene, methylene chloride, carbon tetrachloride, hexane, diethyl ether, tetrahydrofuran, or the like, or a combination comprising at least one of the foregoing solvents may also be used if desired. Co-solvents comprising at least one aprotic polar solvent and at least one non-polar solvent may also be used. In one embodiment, the solvent is xylene or N-methylpyrrolidone.

If a solvent is used, it may be utilized in an amount of about 1 to about 50 wt %, of the total weight of the composition. In one embodiment, if a solvent is used, it may be utilized in an amount of about 3 to about 30 wt %, of the total weight of the composition. In yet another embodiment, if a solvent is used, it may be utilized in an amount of about 5 to about 20 wt %, of the total weight of the composition. It is generally desirable to evaporate the solvent before, during and/or after the blending of the composition.

After solution blending, the solution comprising the desired composition can be cast, spin cast, dip coated, spray painted, brush painted and/or electrostatically spray painted onto a desired substrate. The solution is then dried leaving behind the composition on the surface. In another embodiment, the solution comprising the desired composition may be spun, compression molded, injection molded or blow molded to form an article comprising the composition.

Blending can be assisted using various secondary species such as dispersants, binders, modifiers, detergents, and additives. Secondary species may also be added to enhance one to more of the properties of the composition. Blending can also be assisted by pre-coating the particles with a thin layer of the polymeric material or with a phase that is compatible with the polymeric material, such as, for example a silane layer.

In one embodiment, a composition comprising a polymeric material and the antiferroelectric particles in random orientations and locations may be subjected to an electrical field in order to orient the antiferroelectric particles. The application of the electrical field can be conducted when the composition is in the melt state or in a solution. Solidification can occur in the presence of the electrical field. Upon being subjected to the electrical field, the antiferroelectric particles can be re-aligned into preferred orientation. In one embodiment, the electric field can be used to align these particles into columnar structure so as to give rise to higher dielectric constant.

A composition comprising a polymeric material and the antiferroelectric particles in a low dielectric constant state has advantages over the polymeric material alone. In one embodiment, the composition has a dielectric constant that is at least 10% greater than a composition comprising polymeric material alone. In another embodiment, the composition has a dielectric constant that is at least 50% greater than the polymeric material alone. In another embodiment, the composition has a dielectric constant that is at least 100% greater than the polymeric material alone.

Upon applying an electrical field for converting the antiferroelectric particles to ferroelectric particles, the composition can have a dielectric constant that is at least 200% greater than the polymeric material alone. In one embodiment, upon conversion, the composition has a dielectric constant that is at least 300% greater than a composition comprising polymeric material alone. In another embodiment, upon conversion, the composition has a dielectric constant that is at least 400% greater than the polymeric material alone. In another embodiment, upon conversion, the composition has a dielectric constant that is at least 500% greater than the polymeric material alone.

A composition comprising a polymeric material and particles in a high dielectric constant state (ferroelectric state) has further advantages over the polymeric material and particles in a low dielectric constant state (antiferroelectric state). In one embodiment, the composition has a dielectric constant that is at least 50% greater than a composition comprising polymeric material and particles in a low dielectric constant state. In another embodiment, the composition has a dielectric constant that is at least 100% greater than the polymeric material and particles in a low dielectric constant state. In another embodiment, the composition has a dielectric constant that is at least 500% greater than the polymeric material and particles in a low dielectric constant state.

The composition also has a breakdown voltage that is advantageously greater than the polymeric material alone. In one embodiment, the composition has a breakdown voltage that is at least 50 kilovolts/millimeter. The breakdown is generally determined in terms of the thickness of the composition. In another embodiment, the composition has a breakdown voltage that is at least 100 kilovolts/millimeter. In another embodiment, the composition has a breakdown voltage that is at least 300 kilovolts/millimeter.

The composition also has a corona resistance that is advantageously greater than the polymeric material alone. In one embodiment, the composition has a corona resistance that is resistant to a current of about 1000 volts to 5000 volts applied for about 200 hours to about 2000 hours. In another embodiment, the composition has a corona resistance that is resistant to a current of about 1000 volts to 5000 volts applied for about 250 hours to about 1000 hours. In yet another embodiment, the composition has a corona resistance that is resistant to a current of about 1000 volts to 5000 volts applied for about 500 hours to about 900 hours.

The composition has a dielectric constant greater than or equal to about 3 when measured at frequencies of about 1 to about $10^6$ hertz (Hz). In one embodiment, the composition has a dielectric constant greater than or equal to about 5 when measured at frequencies of about 1 to about $10^6$ hertz (Hz). In yet another embodiment, the composition has a dielectric constant greater than or equal to about 10 when measured at frequencies of about 1 to about $10^6$ hertz (Hz). In yet another embodiment, the composition has a dielectric constant greater than or equal to about 50 when measured at frequencies of about 1 to about $10^6$ hertz (Hz).

In another embodiment, the composition also has an impact strength of greater than or equal to about 5 kiloJoules per square meter ($kJ/m^2$). In another embodiment, the composition has an impact strength of greater than or equal to about 10 $kJ/m^2$. In another embodiment, the composition has an impact strength of greater than or equal to about 15 $kJ/m^2$. In another embodiment, the composition has an impact strength of greater than or equal to about 30 $kJ/m^2$.

Compositions that comprise the nanoparticles may also be optically transparent. In one embodiment, the compositions have a transmissivity to visible light of greater than or equal to about 70%. In another embodiment, the compositions have a transmissivity to visible light of greater than or equal to about 80%. In yet another embodiment, the compositions have a transmissivity to visible light of greater than or equal to about 90%. In yet another embodiment, the compositions have a transmissivity to visible light of greater than or equal to about 95%. In yet another embodiment, the composition also has a Class A surface finish when molded. Molded articles can be manufactured by injection molding, blow molding, compression molding, or the like, or a combination comprising at least one of the foregoing.

The composition can advantageously be used in energy storage and power conversion devices for applications including transient voltage clamping, ripple voltage reduction and waveform correction in resonant circuit. The composition can advantageously be used in spark plug caps, capacitors, defibrillators, xray tubes, or other articles.

The following examples, which are meant to be exemplary, not limiting, illustrate compositions and methods of manufacturing of some of the various embodiments described herein.

EXAMPLES

Example 1

Example 1 illustrates the increase in dielectric constant as a function of increased amounts of nanosized antiferroelectric particles incorporated into a polymeric material. The polymeric material is polyvinylidene fluoride (PVDF) commercially available from Solvay Solexis Inc. The nanosized antiferroelectric particles are NPZ, a rhombohedral-structured lead zirconate. The mean particle size was 100 nanometers. The nanosized antiferroelectric particles were manufactured as follows. Lead oxide and zirconium dioxide were mixed with equimolar mixture of sodium chloride and potassium chloride. The mixture was heated to 900° C. for 6 hours in air in a covered alumina crucible. The reacted mass was then treated with hot water to dissolve off the chloride flux. Fine crystalline lead zirconate was recovered.

The lead zirconate powder was then milled in acetone using a paint shaker for 20 minutes, dried and sieved through a 200-mesh sieve. 0.25 grams of polyvinylidene fluoride (PVDF) was first dissolved in 153 grams of NMP solvent to form a polyvinylidene fluoride (PVDF) solution. The nanosized antiferroelectric particles were added in an amount of about 20 vol % and 40 vol %, based on the total volume of the PVDF as well as the particles. The PVDF solution containing the particles was then cast onto a glass substrate under a clean hood. The solution was dried until films were formed. The composition films were subjected to dielectric constant tests at room temperature at a frequency of $10^2$ to $10^5$ Hz using a dielectric analyzer HP4285A manufactured by Hewlett Packard. The film thickness is 20 to 150 micrometers, which was sputter coated with platinum. The platinum establishes electrical contact with the electrodes of the dielectric analyzer. The results are shown in the FIG. 1. From the FIG. 1 it may be seen that 20 vol % of nanosized antiferroelectric particles increased the dielectric constant of the polymeric material alone by about 250%. Addition of 40 vol % of nanosized antiferroelectric particles increased the dielectric constant of the polymeric material alone by about 450%.

Example 2

Example 2 illustrates the polarization hysteresis loops that are obtained when the polarization is measured for compositions comprising nanosized ceramic antiferroelectric particles and a polymeric material. Nanosized antiferroelectric particles similar in composition to those in Example 1 were incorporated into polyvinylidene fluoride (PVDF) at 20 vol % and 40 vol % as detailed in the Example 1. The nanosized antiferroelectric particles have a particle size of 40 nanometers. Polarization was measured using a Precision LC Ferroelectric test system made by Radiant Technologies Inc. at a frequency of 10 hertz. The results are shown in the graph in FIG. 2. From the graph in the FIG. 2 it may be seen that polarization inside the nanosized particles are switched over by the applied electric field, indicated by the formation of polarization loop. At higher levels of NPZ loading, the polarization switching is more easily triggered.

Example 3

Figure 2:
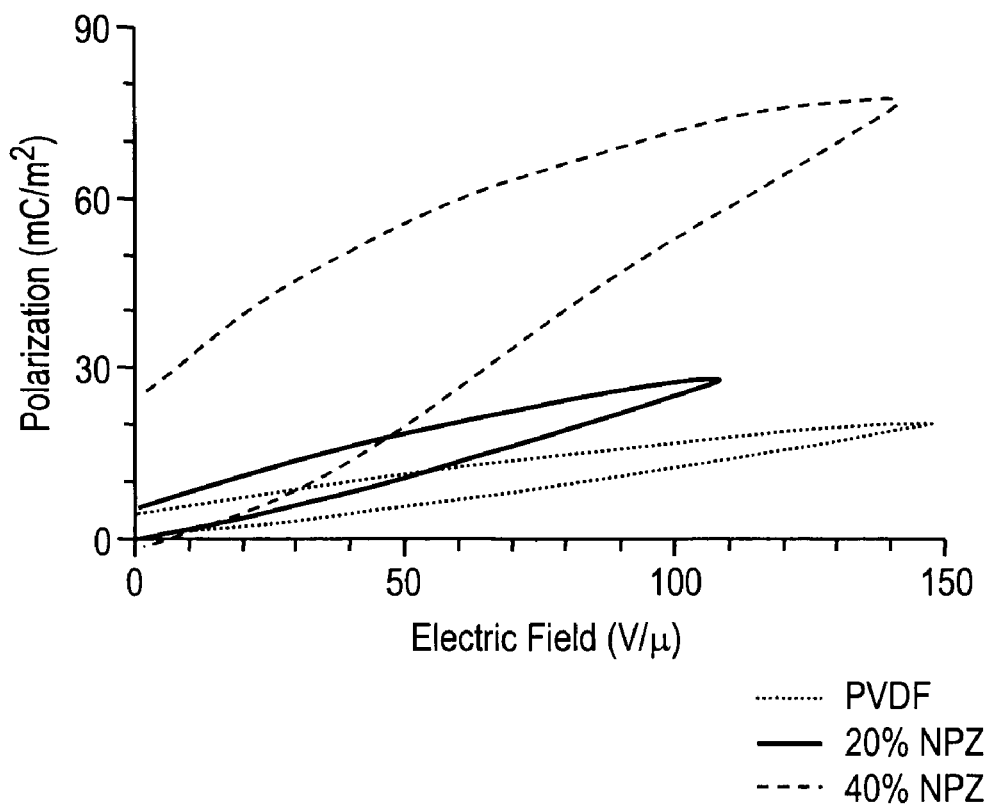
FIG. 2 represents a graph of the polarization hysteresis loops triggered when various weight percents of nanosized antiferroelectric particles are incorporated into a polymeric material.

Example 3 illustrates the field-tunability of the dielectric constant when nanosized antiferroelectric particles are incorporated into a polymeric material. The nanosized antiferroelectric particles were lead zirconate that are 40 nanometers in size and incorporated into polyvinylidene fluoride (PVDF) at 20 vol % and 40 vol % in a manner similar to that described in the Example 1. The dielectric constant was calculated based on the polarization switching behavior as shown in FIG. 2. The dielectric constant was calculated as follows.

Dielectric constant K is defined as shown below in equations (I) and (II)

$$P = (K-1)\epsilon_0 E \quad (I)$$

$$D = K\epsilon_0 E \quad (II)$$

where P is the polarization (as measured in our experiment), D is dipole displacement, $\epsilon_0$ is the permittivity of the vacuum, and E is applied field.

For materials with a high dielectric constant, $P \sim D = K\epsilon_0 E$. For nonlinear dielectrics, $K(E_x)$ at a given field $E_x$ can be defined as shown below in equations (III):

$$K(E_x) = (dP/dE)/\epsilon_0(E_x) \quad (III)$$

K is therefore calculated using equation (III) by taking the derivative of the P~E curve at a specified field E. To reduce the noise of derivation, the reported K values are the average values of the closest 10 experimental data points. Specifically, K is averaged for polarization data measured in the 100 volts/micrometer field range.

Figure 3:
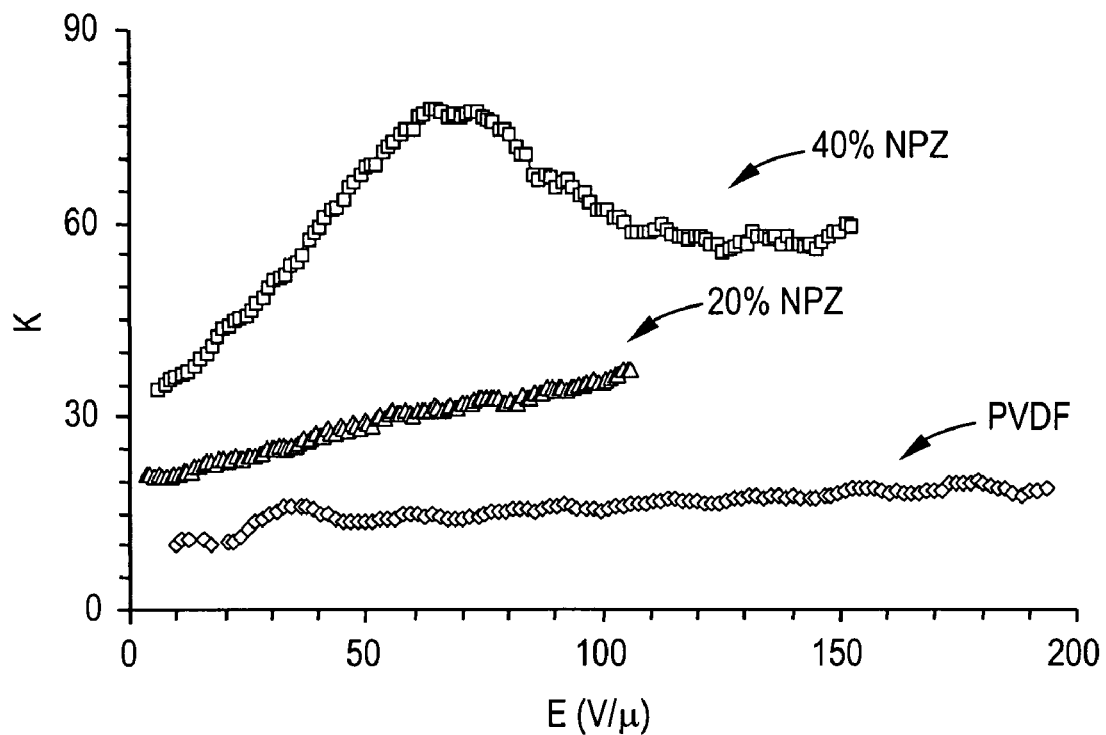
FIG. 3 represents a graph of the field-tunability of the dielectric constant when nanosized antiferroelectric particles are incorporated into a polymeric material.

The results are shown as a graph in FIG. 3. From the FIG. 3 it can be seen that there was an increase of about 50% in dielectric constant under an electric field of about 100 volts/micrometer for the polymeric material having 20 vol % nanosized antiferroelectric particles. For the polymeric material with 40 vol % nanosized antiferroelectric particles, there was a maximum increase of over 200% in dielectric constant under an electric field of about 50 volts/micrometer. This increase in dielectric constant corresponds with a phase transition from an antiferroelectric state to a ferroelectric state.

Example 4

Figure 4:
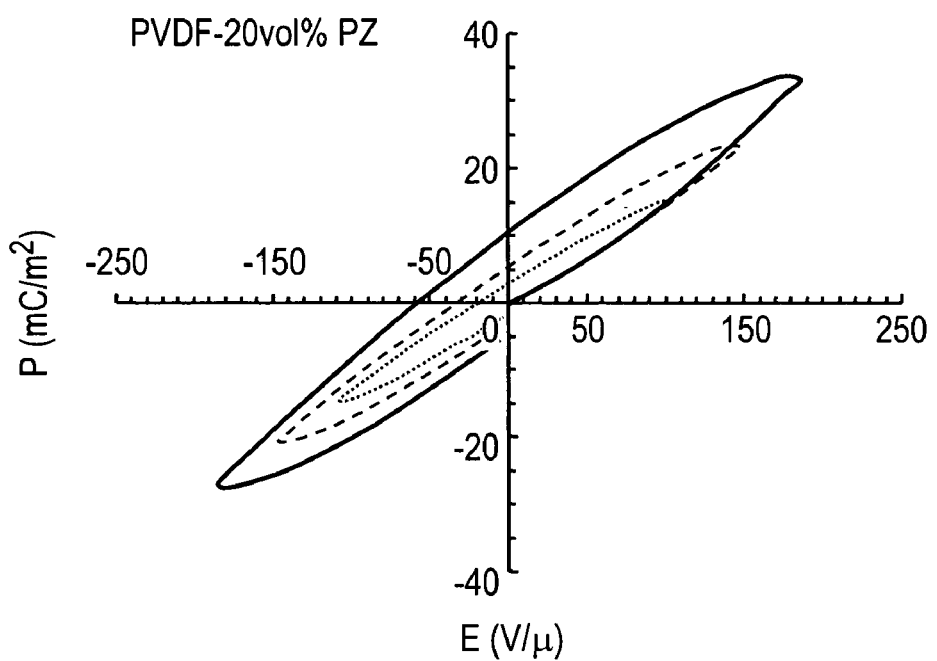
FIG. 4 represents a graph of the polarization hysteresis loops triggered when micrometer sized antiferroelectric particles are incorporated into a polymeric material.

Example 4 illustrates the polarization hysteresis loops triggered when micrometer-sized antiferroelectric particles are incorporated into a polymeric material. The micrometer-sized particles were lead zirconate (PZ) particles. The micrometer sized antiferroelectric particles were 1 to 5 micrometers in size and incorporated into PVDF at 20 vol % and 40 vol % in a manner similar to that described in the Example 1. The polarization hysteresis was measured as described in the Example 2. The results are shown as a graph in FIG. 4 that shows the general behavior of the polarization response of the composites containing 20 vol % PZ under various electric fields. As indicated by FIG. 4, a higher electric field is needed to trigger the antiferroelectric-ferroelectric phase transition in the sample containing 40 vol % filler than the sample containing the 20 vol % filler.

Example 5

Figure 5:
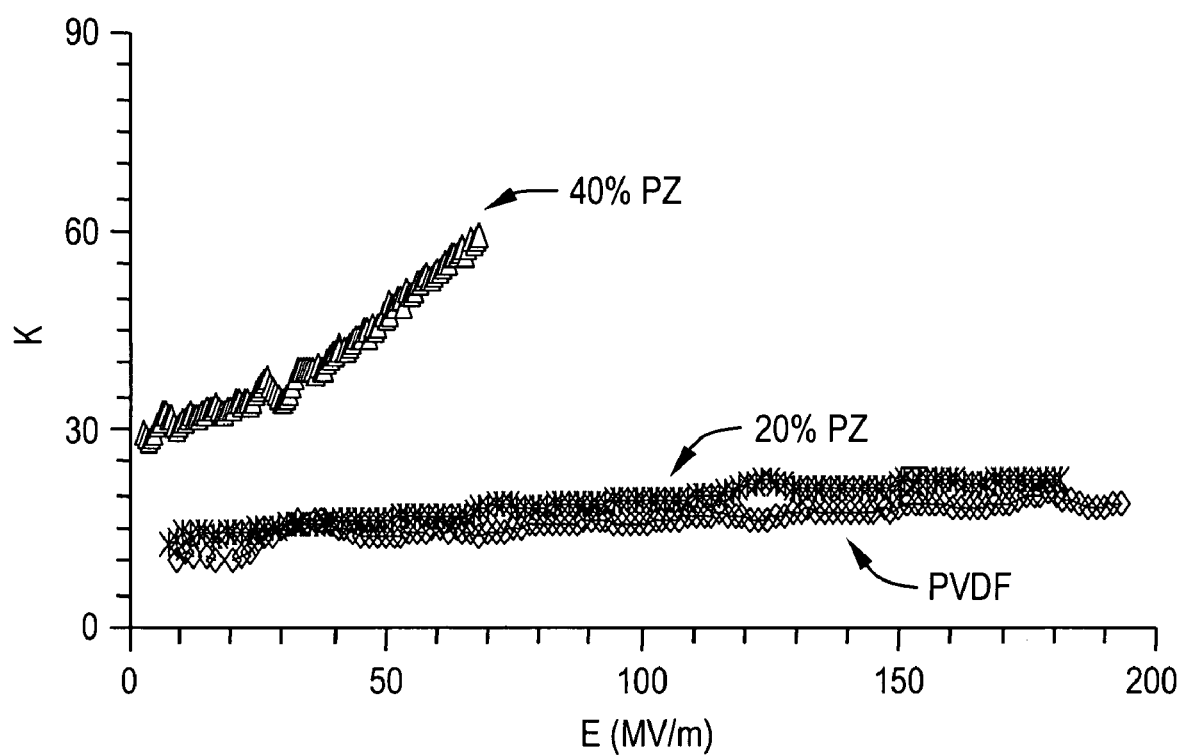
FIG. 5 represents a graph of the field-tunability of the dielectric constant when micrometer sized antiferroelectric particles are incorporated into a polymeric material.

Example 5 illustrates the field-tunability of the dielectric constant when micrometer-sized antiferroelectric particles are incorporated into a polymeric material. The micrometer-sized particles were lead zirconate (PZ) particles. The micrometer sized antiferroelectric particles were 1 to 5 micrometers in size and incorporated into PVDF at 20 vol % and 40 vol % in a manner similar to that described in the Example 1. The dielectric constant was calculated based on the polarization switching behaviors as shown in FIG. 4. The dielectric constants were calculated as described in Example 3. The results are shown as a graph in FIG. 5. The dielectric constant of the polymeric material with 20 vol % micrometer-sized antiferroelectric particles did not show significantly different field-tunability than that of the polymeric material alone. However, the dielectric constant of the polymeric material with 40 vol % micrometer-sized antiferroelectric particles showed a significantly different field-tunability than that of the polymeric material alone. For example, FIG. 5 shows about a 100% increase in dielectric constant of the polymeric material with 40 wt % micrometer-sized antiferroelectric particles under an electric field of about 60 volts/micrometer over the polymeric material alone.

From the above examples it may be seen that the dielectric constant of the composition can be increased by at least 50% over a polymeric material that does not contain the antiferroelectric particles. In one embodiment, the dielectric constant of the composition is increased by at least 200% over a polymeric material that does not contain the antiferroelectric particles. In another embodiment, the dielectric constant of the composition is increased by at least 400% over a polymeric material that does not contain the antiferroelectric particles.

In one exemplary embodiment, the composition can have an impact strength of greater than or equal to about 10 kJ/m$^2$, a Class A surface finish and a breakdown strength of at least 100 V/micrometer.

In another exemplary embodiment, the composition can have an impact strength of greater than or equal to about 10 kJ/m$^2$, a Class A surface finish and a corona resistance of about 1000 volts to 5000 volts applied for about 200 hours to about 2000 hours.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition comprising:
a polymeric material; and
ceramic antiferroelectric particles having a particle size of from about 10 nanometers to about 500 nanometers;
wherein the antiferroelectric particles comprise $PbHfO_3$, $PbLa(ZrSnTi)O_3$, $PbNb(ZrSnTi)O_3$, lead scandium niobium titanate (PSNT), lead lutetium niobium titanate (PLuNT), $NaNbO_3$, $(K,Na)(Nb,Ta)O_3$, $KNbO_3$, $BaZrO_3$, $Na_{0.25}K_{0.25}Bi_{0.5}TiO_3$, $Ag(Ta,Nb)O_3$, $K_{0.5}Bi_{0.5}TiO_3$—$BaTiO_3$, or a combination of these and wherein the ceramic antiferroelectric particles are present in an amount of greater than about 10 wt % of the total weight of the composition.

2. The composition of claim 1, wherein the polymeric material comprises a thermoplastic polymer.

3. The composition of claim 2, wherein the polymeric material comprises one or more polyetherimides, polyvinylidene fluoride, modified polyvinylidene fluorides, or a combination of these.

4. The composition of claim 1, wherein the polymeric material comprises a thermosetting polymer.

5. The composition of claim 1, wherein the antiferroelectric particle in the antiferroelectric state has a dielectric constant whose value is within 50% of the value of the dielectric constant of the polymeric material.

6. The composition of claim 1, wherein the polymeric material is used in amount of from about 50 wt % to about 99.3 wt % of the total weight of the composition.

7. The composition of claim 1, wherein at least a portion of the ceramic antiferroelectric particles are surface treated.

8. The composition of claim 7, wherein the surface treatment comprises a silane coupling agent.

9. The composition of claim 8, wherein the surface treatment agent comprises tetramethylchlorosilane, hexadimethylenedisilazane, gamma-aminopropoxysilane, or a combination of these.

10. The composition of claim 1, wherein the antiferroelectric particles are present in an amount of greater than or equal to about 30 wt % of the total weight of the composition.

11. The composition of claim 1, wherein the antiferroelectric particles are present in an amount of less than or equal to 85 wt % of the total weight of the composition.

12. The composition of claim 11, wherein the antiferroelectric particles are present in an amount of less than or equal to about 70 wt % of the total weight of the composition.

13. An article manufactured using the composition of claim 1.

14. The article of claim 13, wherein the article is a capacitor or a component for a spark plug.

* * * * *

UNITED STATES PATENT AND TRADEMARK OFFICE
CERTIFICATE OF CORRECTION

| | | |
|---|---|---|
| PATENT NO. | : 7,923,497 B2 | Page 1 of 1 |
| APPLICATION NO. | : 11/286062 | |
| DATED | : April 12, 2011 | |
| INVENTOR(S) | : Tan et al. | |

It is certified that error appears in the above-identified patent and that said Letters Patent is hereby corrected as shown below:

On the Title Page, in Field (57), under "ABSTRACT" in Column 2, Line 1, after "herein is" delete "a composition comprising".

In Column 1, Line 58, delete "DETAILED" and insert -- BRIEF --, therefor.

In Column 5, Line 42, in Equation, delete "(III)" and insert -- (II) --, therefor.

In Column 8, Line 57, delete "on" and insert -- one --, therefor.

Signed and Sealed this
Twelfth Day of July, 2011

David J. Kappos
*Director of the United States Patent and Trademark Office*